US006840046B2

(12) United States Patent
Paschereit et al.

(10) Patent No.: US 6,840,046 B2
(45) Date of Patent: *Jan. 11, 2005

(54) METHOD AND APPARATUS FOR MINIMIZING THERMOACOUSTIC VIBRATIONS IN GAS-TURBINE COMBUSTION CHAMBERS

(75) Inventors: Christian Oliver Paschereit, Baden (CH); Wolfgang Weisenstein, Remetschwil (CH); Ephraim Gutmark, Baton Rouge, LA (US); Wolfgang Polifke, Freising (DE)

(73) Assignee: Alstom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 236 days.

(21) Appl. No.: 09/393,714

(22) Filed: Sep. 10, 1999

(65) Prior Publication Data

US 2001/0027638 A1 Oct. 11, 2001

(30) Foreign Application Priority Data

Sep. 10, 1998 (EP) .............................. 98810903

(51) Int. Cl.⁷ .............................................. F02C 7/24
(52) U.S. Cl. ....................................................... 60/725
(58) Field of Search .................... 60/776, 725; 431/114

(56) References Cited

U.S. PATENT DOCUMENTS

| 4,557,106 A | 12/1985 | Williams et al. |
| 5,005,353 A | 4/1991 | Acton et al. |
| 5,428,951 A | 7/1995 | Wilson et al. |
| 5,791,889 A | 8/1998 | Gemmen et al. |
| 6,205,764 B1 * | 3/2001 | Hermann et al. ........... 431/114 |

FOREIGN PATENT DOCUMENTS

| DE | 19704540 C1 * | 7/1998 | ............. F02C/7/00 |
| WO | WO93/10401 | 5/1993 | |

OTHER PUBLICATIONS

Biography of Prof. John E. Ffowcs Williams, http://www.eng.cam.ac.uk/~jefw, Jun. 16, 2003.*

* cited by examiner

*Primary Examiner*—Ehud Gartenberg
(74) *Attorney, Agent, or Firm*—Burns, Doane, Swecker & Mathis, L.L.P.

(57) ABSTRACT

In a method of minimizing thermoacoustic vibrations in gas-turbine combustion chambers, a modulated spraying of liquid or gaseous premix fuel into a premix burner is carried out. The premix fuel is fed by means of two fuel lines (13, 14), and the modulation of the quantity of fed fuel is effected in each case by one fuel valve per fuel line.

7 Claims, 5 Drawing Sheets

METHOD AND APPARATUS FOR MINIMIZING THERMOACOUSTIC VIBRATIONS IN GAS-TURBINE COMBUSTION CHAMBERS

BACKGROUND OF THE INVENTION

1. Field of the Invention

The invention relates to a method and an apparatus for minimizing thermoacoustic vibrations in gas-turbine combustion chambers.

2. Discussion of Background

It is known that undesirable thermoacoustic vibrations often occur in combustion chambers of gas turbines. The term "thermoacoustic vibrations" designates mutually amplifying thermal and acoustic disturbances. In the process, high vibration amplitudes may occur and these may lead to undesirable effects, such as, for instance, high mechanical loading of the combustion chamber, increased $NO_x$ emission due to inhomogeneous combustion, and even extinction of the flame. This applies in particular to combustion systems having low acoustic damping. In order to ensure a high output with regard to pulsations and emissions over a wide operating range, active control of the combustion vibrations may be necessary.

The fluidic stability of a gas-turbine burner is of decisive importance for the occurrence of thermoacoustic vibrations. The fluidic instability waves arising in the burner lead to the formation of vortices. These vortices, also designated as coherent structures, are important during mixing actions between air and fuel. The dynamics of the coherent structures influence the combustion and the heat release associated therewith. The vortices may therefore lead to periodic heat release of the flame of the burner and thus to pressure fluctuations. In particular, if there is no homogeneous mixing of fuel and air over the entire area of the burner, the development of coherent vortex structures has a considerable effect on the formation of thermoacoustic instability. Thus a further possibility of reducing the tendency of a burner to vibrate is to stablize the flame of the premix burner.

SUMMARY OF THE INVENTION

Accordingly, one object of the invention is to provide a novel method of minimizing the pressure amplitude of thermoacoustic vibrations in gas-turbine combustion chambers. This object is achieved according to the invention by the method of minimizing the pressure amplitude of thermoacoustic vibrations in a gas turbine of the independent patent claim 1 and by the apparatus according to independent patent claim 11.

The quantity of fuel which is converted into extensive vortices can be influenced by controlled modulation of the fuel flow of the premixing of a premix burner. According to the invention, the spraying of liquid or gaseous fuel into the premix burner is effected in a modulated manner. According to the invention, the expression modulated spraying refers to any fuel spraying varying with respect to time. According to the invention, the modulation may be effected at any frequency. The spraying is preferably effected at a frequency of between 0.3 Hz and 5 kHz, the range of 5 Hz to 200 Hz being especially preferred. In this case, the spraying is effected independently of the phase of the pressure vibrations in the combustion system.

FIG. 1 shows a premix burner in which the method according to the invention for minimizing the pressure amplitude of thermoacoustic vibrations may be used. The burner has two fuel lines 13, 14, which are provided with openings 15 through which the gaseous or liquid fuel 16 is admixed with the combustion air 7.

The exact position of the openings 15 through which the fuel 16 is admixed with the combustion air 7 can be seen more clearly from FIG. 2. The fuel lines 13, 14 are attached to the sectional bodies 1, 2, so that the openings 15 are lined up along two straight lines which run parallel to and at the same distance from the main center axis 26 (=burner axis) of the premix burner. All the openings 15 lie in one plane, the fuel-injection plane.

According to the invention, the spraying of fuel through the openings 15 is not effected constantly with respect to time but in a modulated manner. Thus the quantity of fuel which is fed through the fuel lines 13, 14 is varied.

The fuel lines 13, 14 extend from a steadying chamber (not shown), which is supplied from an individual fuel line (not shown), in the direction of the sectional bodies 1, 2. In this embodiment, the modulation is effected by opening and closing a fuel valve, as a result of which the quantity of fuel which is fed to the steadying chamber and thus also the quantity of fuel which is transported through the fuel lines 13, 14 can be varied. In this embodiment according to the invention, the quantity of fuel in the two fuel lines 13, 14 is thus varied in the same manner (symmetrically).

In a further embodiment according to the invention, the quantity of fuel fed in each case through a fuel line 13, 14 is varied by means of one fuel valve each. To this end, the burner described above must be technically modified. This is done either by passing the fuel lines 13, 14 through the steadying chamber, as a result of which a separate supply of the two lines with fuel is made possible, or by attaching in each case a separate steadying chamber for each of the fuel lines 13, 14. These separate steadying chambers are then separately supplied with fuel. In both cases, the quantity of fuel which is fed through the fuel lines 13, 14 to the premix burner is varied by means of one fuel valve each. The modulation of the quantity of fuel fed through the fuel line 13 is therefore effected independently of the modulation of the fuel quantity fed through the fuel line 14. There may therefore be any desired phase displacement between the two modulated fuel flows. In the extreme case, the modulation of the fuel flows is effected in such a way as to be displaced in phase by 180° (antisymmetrically), i.e., during maximum spraying through one fuel line, minimum spraying is effected through the other fuel line.

The case described above of the symmetrical modulation may of course also be carried out with the modified burner, that is by means of two fuel valves. In this case, the quantity of fuel let through by the one fuel valve essentially corresponds, at any instant, to the quantity of fuel let through by the second fuel valve.

According to the invention, therefore, any desired phase displacement φ between the two fuel flows may be used. In a preferred embodiment, the modulation in both fuel lines is effected uniformly (φ=0°). In a further, especially preferred embodiment, the modulation of the fuel flows is effected in such a way as to be displaced in phase by 180°, i.e., during maximum spraying through one fuel line, minimum spraying is effected through the other fuel line.

For the case φ=180°, the axial symmetry of the flame of the premix burner is disturbed in an especially effective manner. In the case of low-frequency thermoacoustic pressure vibrations of high amplitude, it is known that extensive axially symmetrical vortex structures are responsible for the periodic heat release. The effect of such structures on the combustion is most effectively influenced by the axial symmetry of the flame being disturbed, which according to the present invention is achieved by the phase-displaced modulation of the two premix fuel flows. Especially advantages effects are obtained for a phase displacement of 180°.

Alternatively, the spraying, within the scope of the present invention, in an especially preferred embodiment, may be effected in such a way that it is in a fixed phase relationship with the pressure vibrations. In this case, the phase of the pressure vibrations is determined, for example, via a microphone in the combustion chamber and this phase information is used for controlling the spraying.

The instantaneous spraying of the fuel is preferably phase-coupled with a signal measured in the combustion system. In this case, a signal which is correlated with the thermoacoustic vibrations is measured in the combustion system. This signal may be measured downstream of the burner in the combustion chamber or in a steadying chamber arranged upstream of the burner. Means which control the instantaneous spraying of the fuel as a function of the measuring signal are then preferably provided.

By the selection of a suitable phase difference between measuring signal and instantaneous spraying, which phase difference varies depending on the type of measured signal, the modulated spraying of the fuel counteracts the formation of coherent structures in an especially suitable manner, so that the amplitude of the pressure pulsation is reduced.

A pressure signal which indicates the pressure fluctuations associated with the thermoacoustic vibrations is advantageously measured in the combustion system. This may be done, for instance, with one or more microphones arranged in the combustion chamber, in the steadying chamber or on a wall of one of the chambers.

Another possibility consists in measuring an optical signal which is correlated with the heat-release fluctuations of the combustion process. In this case, a chemiluminescence emission is advantageously measured, preferably from one of the radicals OH or CH. An optical signal is recorded with a sensor for visible or infrared radiation, preferably an optical fiber probe.

The signal measured in the combustion system is advantageously filtered, phase-shifted and amplified, and the signal which is thus obtained is used as an input signal for the control of the instantaneous spraying of liquid or gaseous fuel. If necessary, the signal is additionally amplified before the filtering. The filtering suppresses a disturbing noise signal and preferably consists of a bandpass filter. The phase shift takes into account the fact that, as a rule, phase displacements occur due to the arrangement of the measuring sensors and due to the measuring instruments and the lines themselves. If the relative phase is selected in such a way that as large a reduction in the pressure amplitudes as possible is obtained, all of these phase-shifting effects are implicitly taken into account. The value of the phase shift, after determining a favorable value, may remain fixed. However, since the most favorable relative phase can change with the operating conditions, the relative phase remains advantageously variable and is matched, for instance by controlling the pressure fluctuations, in such a way that considerable suppression is always ensured.

As described above for the phase-independent modulation, this phase-coupled modulation of the premix fuel flow is effected by opening and closing one (symmetric modulation) or two fuel valves, as a result of which the quantity of fuel which is fed through the fuel lines 13, 14 may be varied. In the phase-coupled modulation, too, when two fuel valves are used, the variation in the quantity of fuel fed through one fuel line is effected according to the invention independently of the modulation of the fuel quantity fed through the second fuel line.

According to the invention, therefore, there may again be any desired phase displacement φ between the two fuel flows. In a preferred embodiment, the modulation in both fuel lines is effected uniformly (φ=0°). In a further, especially preferred embodiment, the modulation of the fuel flows is effected in such a way as to be displaced in phase by 180°, i.e., for example during maximum spraying through the fuel line 13, minimum spraying is effected through the fuel line 14.

For the case φ=180°, the especially advantageous effects described above for the phase-independent modulation appear.

Fuel valves which react to control signals with a quick change in the quantity of sprayed fuel (quick-acting fuel valves) are preferably used for the modulation of the sprayed fuel.

The quantity of fuel sprayed per unit of time may be varied within wide ranges within the scope of the present invention. According to the invention, as described above, a modulation of the quantity of fuel sprayed into the premix burner is effected. In a preferred embodiment, in addition to the spraying of a constant quantity of fuel into the premix burner, at the same time the spraying of an additional modulated quantity of fuel is effected in the form of a pulse limited with respect to time, in which case no additional fuel is then sprayed for a certain time. This procedure is necessary, since no fuel at all would be sprayed at certain times during a pulse-like variation of the entire fuel flow. However, this would lead to the flame of the burner becoming leaner and being extinguished. Therefore the spraying of a constant quantity of fuel and the spraying of pulses, limited with respect to time, of an additional quantity of fuel are effected simultaneously.

If the period of the additional fuel spraying is designated by $t_{add}$ and the period without additional fuel spraying is designated by to, the period duration of the modulation of the fuel spraying is given by $\tau=t_{add}+t_0$ and the frequency is given by $v=1/\tau=1$ $(t_{add}+t_0)$.

Within the scope of the present invention, the ratio of $t_{add}$ to $\tau$ is expressed in percent with the term "duty cycle". At a duty cycle of 50%, the period of the additional fuel spraying is therefore equal to the period in which no additional fuel is sprayed. The addition of a constant quantity of fuel, that is no additional spraying, corresponds to a duty cycle of 100%.

The spraying of fuel into the premix burner is effected according to the invention with a duty cycle less than 100%. The range 1%≦duty cycle≦50% is preferred.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates an exemplary embodiment of the present invention.

DESCRIPTION OF THE PREFERRED EMBODIMENTS

Figure 1:
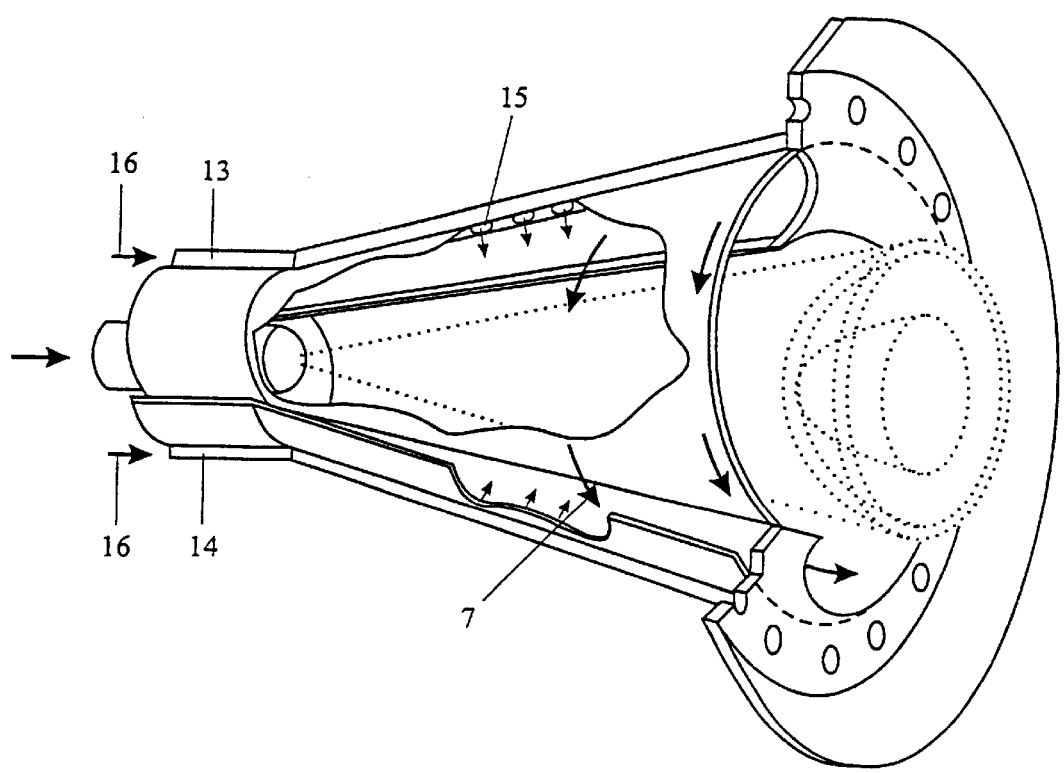
FIG. 1 shows a burner in perspective representation, in appropriate cutaway section.
Figure 2:
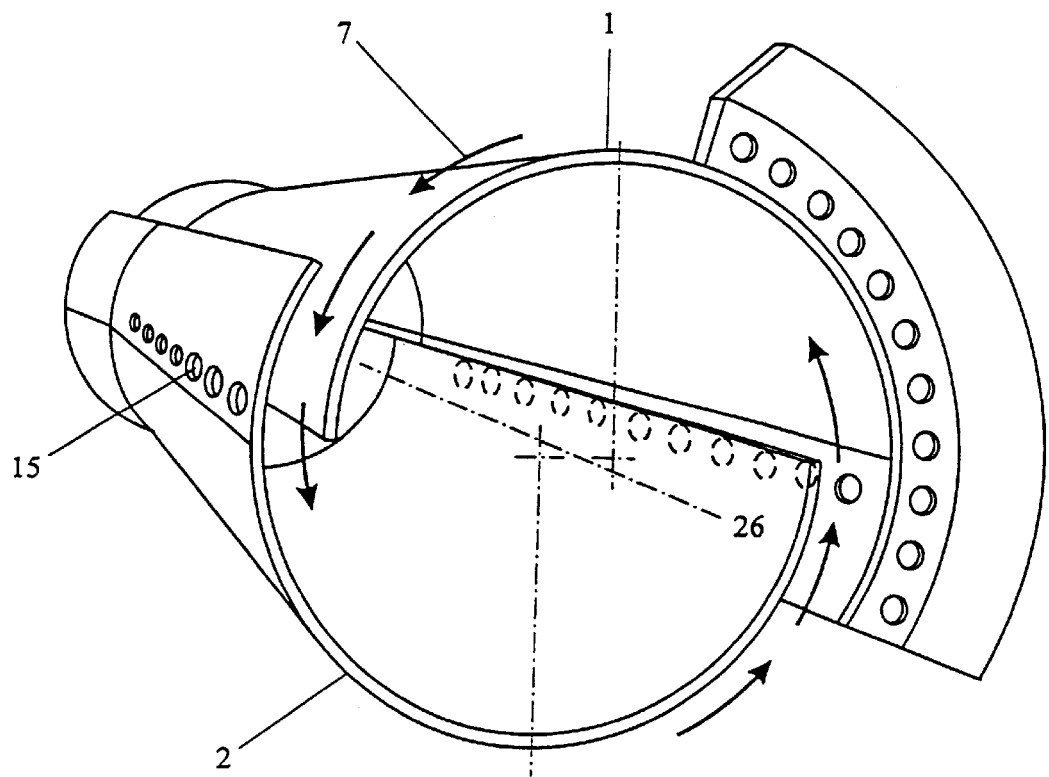
FIG. 2 shows the premix burner according to FIG. 1 but from another perspective and in simplified representation.
Figure 3:
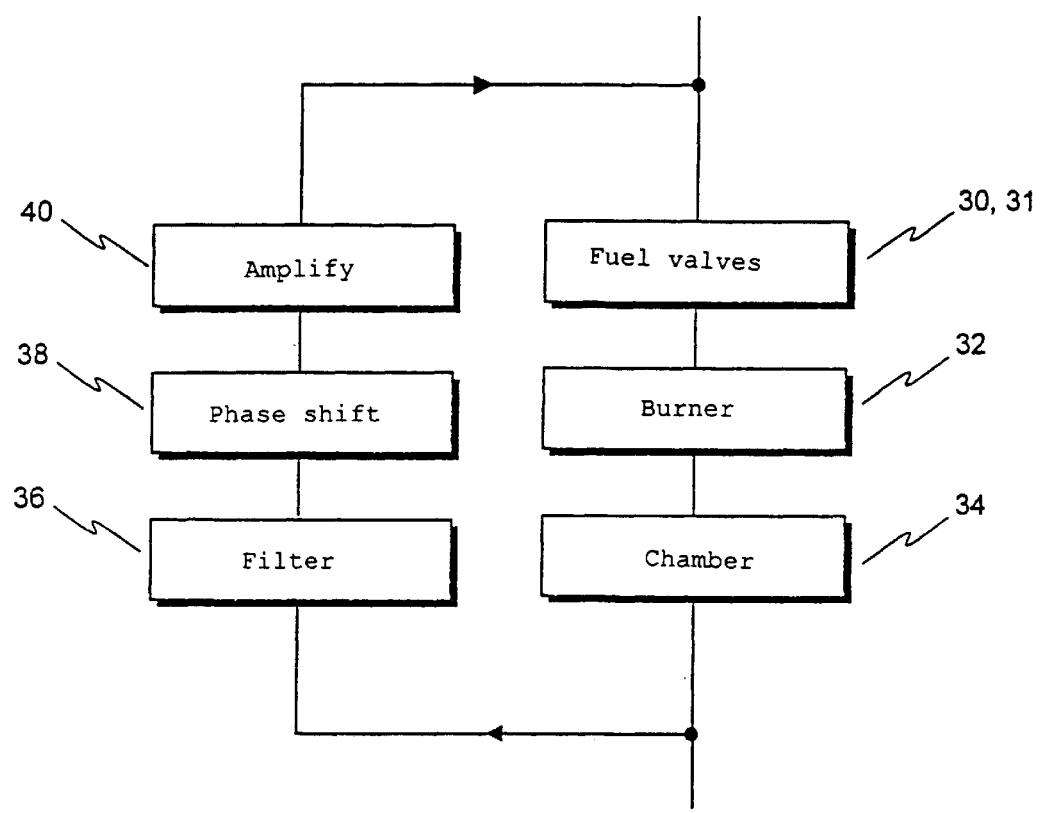
FIG. 3 shows a flow diagram of an embodiment of the method according to the invention for the phase-coupled, modulated spraying of fuel.

Referring now to the drawings, wherein like reference numerals designate identical or corresponding parts throughout the several views, the spraying of the fuel, in the most common embodiments, described above, of the present invention, is effected independently of the phase of the pressure vibrations in the combustion system. Alternatively, the spraying, in an especially preferred embodiment, may be effected in such a way that it is in a fixed phase relationship with the pressure vibrations. This phase-coupled, modulated spraying of fuel is explained with reference to a flow diagram (FIG. 3). A closed control loop is used to activate the fuel valves 30, 31. For noise suppression, the pressure or luminescence signal measured in the combustion chamber is filtered (reference numeral 36), phase-shifted (reference numeral 38) and amplified (reference numeral 40) and is used to control the fuel valves 30, 31. The fuel modulated by means of the fuel valves 30, 31 is sprayed into the burner 32, adjoining which is the chamber 34, which in this case comprises the combustion chamber. The measurement of the abovementioned pressure or luminescence signal takes place in one of the chambers of the combustion system (steadying chamber or combustion chamber), as a result of which the control loop is closed.

Figure 4:
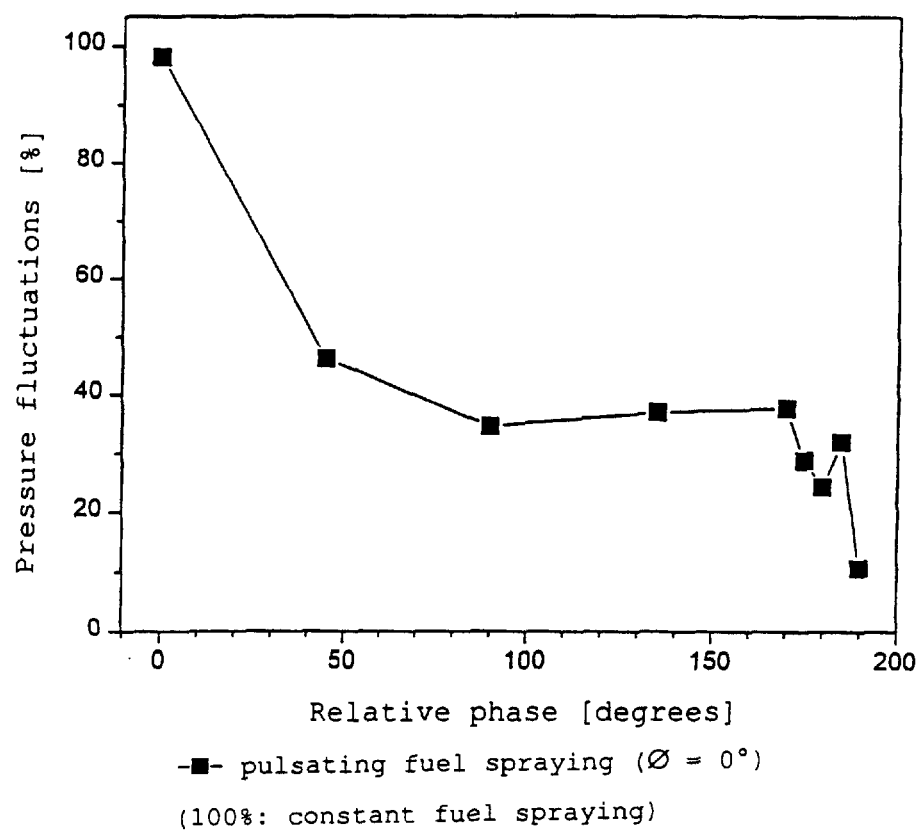
FIG. 4 shows a plot of the relative pressure fluctuation during phase-coupled, modulated spraying of fuel (φ=0°) relative to the pressure fluctuation during spraying of a constant fuel quantity (100%) as a function of the relative phase between measuring signal and instantaneous spraying.

FIG. 4 shows the results of an experimental analysis of the pressure fluctuations in an exemplary embodiment in which the combustion system was susceptible to axially symmetrical, thermoacoustic vibrations at a frequency of about 100 Hz. The pressure fluctuations during phase-coupled, modulated spraying of fuel relative to the pressure fluctuations during spraying of a constant fuel quantity (100%) are shown in FIG. 4. The spraying of the fuel was effected by quick-acting fuel valves from MOOG.

In the present example, a B&K water-cooled microphone recorded the acoustic resonances of the chamber. The signals were preamplified, bandpass-filtered and phase-shifted. In the process, the phase shift was varied systematically between 0° and 190°. The resulting signal formed the trigger for a signal generator, which activated the fuel valves via an amplifier stage. The modulation of the two fuel flows was effected without phase displacement relative to one another ($\phi=0°$). FIG. 4 shows that the pressure amplitudes are reduced by up to 87 percentage points if a suitable phase shift is selected.

Figure 5:
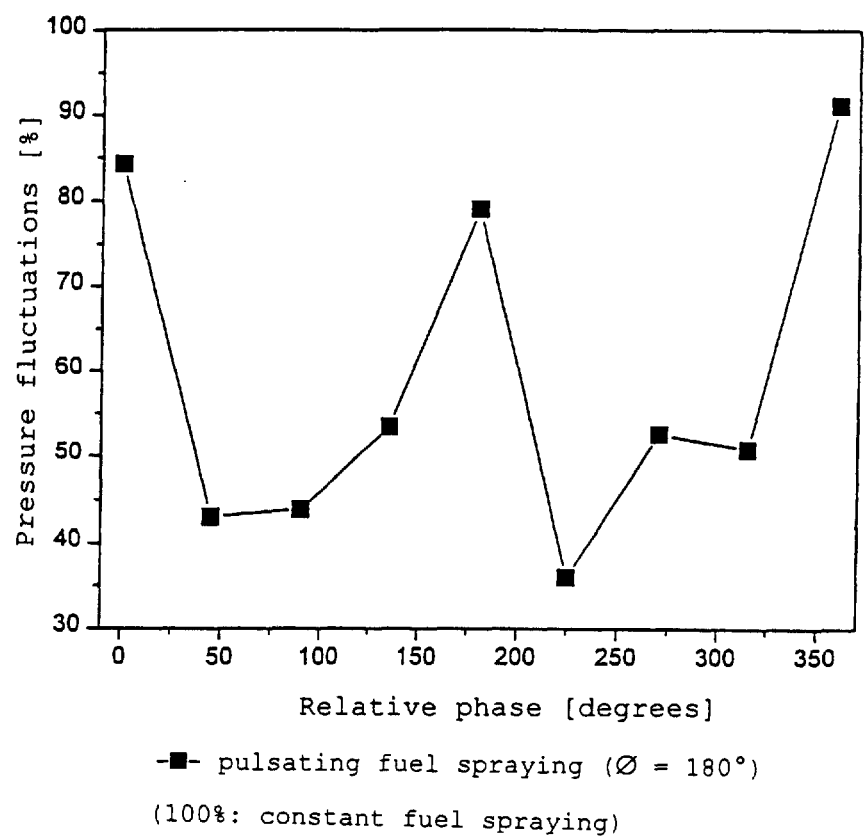
FIG. 5 shows a plot of the relative pressure fluctuation during phase-coupled, modulated spraying of fuel (φ=180°) relative to the pressure fluctuation during spraying of a constant fuel quantity (100%) as a function of the relative phase between measuring signal and instantaneous spraying.

FIG. 5 shows the results of an experimental analysis of the pressure fluctuations in an exemplary embodiment in which the combustion system was susceptible to axially symmetrical, thermoacoustic vibrations at a frequency of about 100 Hz. The pressure fluctuations during phase-coupled, modulated spraying of fuel relative to the pressure fluctuations during spraying of a constant fuel quantity (100%) are shown in FIG. 5. The spraying of the fuel was effected by quick-acting fuel valves from MOOG.

In the present example, a B&K water-cooled microphone recorded the acoustic resonances of the chamber. The signals were preamplified, bandpass-filtered and phase-shifted. In the process, the phase shift was varied systematically between 0° and 360°. The resulting signal formed the trigger for a signal generator, which activated the fuel valves via an amplifier stage. The signals to the two fuel valves were additionally displaced in phase relative to one another in each case by 180°, as a result of which the modulation of the two fuel flows was effected with a phase displacement of 180° ($\phi=180°$). FIG. 5 shows that the pressure amplitudes are reduced by up to 55 percentage points if a suitable relative phase is selected.

FIG. 6 illustrates a combustion system with two fuel valves, one fuel valve per fuel line, working under phase shift $\Phi=180$ degrees. The sensor may be a pressure sensor or an optical sensor, which is indicated by reference numeral 35. Reference 42 symbolizes the phase shifting of the signals for activating the fuel valves 30 and 31 relative to one another.

Obviously, numerous modifications and variations of the present invention are possible in light of the above teachings. It is therefore to be understood that, within the scope of the appended claims, the invention may be practiced othewise than as specifically described herein.

What is claimed as new and desired to be secured by Letters Patent of the United States is:

1. A method for minimizing a pressure amplitude of thermoacoustic vibrations in a combustion system, the method comprising:

measuring a pressure in the combustion system;

feeding a first quantity of fuel through a first fuel line in a pulsating process based on the measured pressure in the combustion system where feeding the first quantity of fuel to the first fuel line minimizes the pressure amplitude of thermoacoustic vibrations;

feeding a second quantity of fuel through a second fuel line in a pulsating process based on the measured pressure in the combustion system where feeding the second quantity of fuel to the second fuel line minimizes the pressure amplitude of thermoacoustic vibrations; and completing a modulation period, the modulation period including the feeding of the first quantity of fuel and the feeding of the second quantity of fuel wherein a pulse of the pulsating process is limited with respect to both time and subsequent feeding of the second quantity of fuel.

2. The method according to claim 1, wherein an instantaneous spraying of liquid or gaseous premix fuel is phase-coupled with a signal measured in the combustion chamber.

3. The method according to claim 2, in which the signal measured in the combustion system is filtered, phase-shifted and amplified, and the signal which is thus obtained controls fuel valves, which regulate the instantaneous spraying of liquid or gaseous premix fuel.

4. The method according to claim 2, wherein the signal measured in the combustion system is a chemiluminescence signal.

5. The method according to claim 2, in which the signal measured in the combustion system is measured in the combustion chamber or in a steadying chamber.

6. The method according to claim 1, wherein the modulation of the fed quantity of premix fuel in the two fuel lines is effected with any relative phase displacement $\phi$.

7. The method according to claim 6, wherein the modulation of the fed quantity of premix fuel in the two fuel lines is effected with a phase displacement $\phi=180°$.

\* \* \* \* \*